United States Patent [19]

Kim

[11] Patent Number: 5,477,522
[45] Date of Patent: Dec. 19, 1995

[54] APPARATUS FOR CONTROLLING SPINDLE MOTOR OF COMPACT DISC UTILIZING APPLIANCE

[75] Inventor: Sung H. Kim, Seoul, Rep. of Korea

[73] Assignee: Goldstar Co., Ltd., Seoul, Rep. of Korea

[21] Appl. No.: 854,846

[22] Filed: Mar. 20, 1992

[30] Foreign Application Priority Data

Mar. 21, 1991 [KR] Rep. of Korea ............... 4455/1991

[51] Int. Cl.$^6$ ............ G11B 17/06; G11B 21/08; G11B 19/24
[52] U.S. Cl. ................ 369/267; 369/32; 369/50
[58] Field of Search .................. 369/264, 266, 369/240, 239, 32, 50, 267; 360/72.1, 73.03; 318/67 R, 68 B

[56] References Cited

U.S. PATENT DOCUMENTS

| | | | |
|---|---|---|---|
| 4,041,293 | 8/1977 | Kihlberg | 235/151.32 |
| 4,079,942 | 3/1978 | Kunen | 369/266 |
| 4,439,849 | 3/1984 | Nabeshima | 369/240 |
| 4,530,083 | 7/1985 | Ishihara | 369/267 |
| 4,606,223 | 9/1986 | Matsunaga et al. | 73/116 |
| 4,675,855 | 6/1987 | Iso et al. | 369/240 |
| 4,751,693 | 6/1988 | Yoshimaru | 369/32 |
| 4,789,975 | 12/1988 | Taniyama | 369/267 |
| 4,796,249 | 1/1989 | Baas | 369/240 |
| 4,809,094 | 2/1989 | Akiyama | 360/72.1 |
| 4,866,695 | 9/1989 | Suzuki et al. | 369/266 |
| 5,136,560 | 8/1992 | Hangai et al. | 369/32 |
| 5,161,142 | 11/1992 | Okano | 369/50 |

FOREIGN PATENT DOCUMENTS

| | | |
|---|---|---|
| 49136 | 4/1982 | European Pat. Off. . |
| 123946 | 11/1984 | European Pat. Off. . |
| 178657 | 4/1986 | European Pat. Off. . |
| 3334900 | 3/1984 | Germany . |
| 3424105 | 1/1985 | Germany . |
| 8605310 | 9/1986 | WIPO . |

OTHER PUBLICATIONS

Patent Abstracts of Japan vol. 14, No. 25 (P–991) (JP A–1264663).
Patent Abstracts of Japan vol. 13 No. 505 (P–959) JPA1204278.

Primary Examiner—Stuart S. Levy
Assistant Examiner—Brian E. Miller

[57] ABSTRACT

An apparatus and method for controlling spindle motor of compact disc utilizing appliance are disclosed, in which the spindle motor is controlled early to meet a rotation speed on a target track, in a rough search, so that a phase locked loop (PLL)servo is normally operated, immediately after the search, thereby enabling the time required in accessing information to be reduced. The apparatus includes a device for detecting the rotation speed of the spindle motor. In the search mode, the frequency corresponding to the detected rotation speed of the spindle motor is compared with a reference frequency corresponding to a rotation speed on the target track. A signal indicative of the comparison result is differentially amplified, to control the spindle motor to correspond to the rotation speed on the target track, in the search mode. After a compact disc has been loaded, the rotation speed in a track corresponding to a reference position at which a reference value is set is detected, so that the inherent deviation in constant linear velocity is calculated, based on the reference value, and corrected upon calculating the number of tracks.

4 Claims, 6 Drawing Sheets

APPARATUS FOR CONTROLLING SPINDLE MOTOR OF COMPACT DISC UTILIZING APPLIANCE

BACKGROUND OF THE INVENTION

1. Field of the Invention

The present invention relates to an apparatus and a method for controlling a spindle motor of a compact disc utilizing appliance. In particular, an apparatus and a method for controlling a spindle motor of compact disc utilizing appliance, in which the spindle motor is controlled in advance to meet a rotation speed on a target track, in a track search mode, so that a phase locked loop (PLL) servo is normally operated, immediately after the search while in a normal operation mode to, thereby enabling the time .Ih22 required in accessing information to be reduced.

2. Description of the Prior Art

In compact disc (CD) utilizing appliances such as CD-ROM drives or CD players, information stored in a target track is generally accessed by performing a track search mode for moving a pick-up to the target track. A microcomputer equipped in a system control unit controls rotation direction and time of a spindle motor adapted to rotate a disc, so as to move the pick-up to the target track. That is, the microcomputer takes information about the time required in moving the pick-up from the current pick-up position to the target track and then calculates the number of tracks presented between the current pick-up position and the target track, according to the taken time information, so that it controls the rotation rate of the spindle motor, based on the calculated number of tracks, thereby controlling the pick-up to move It to the target track.

in order to provide a rapid accessing which is one of the important factors in evaluating the performance of a CD disc, utilizing appliance, the microcomputer should calculate accurately the number of tracks presented between the track at which the pick-up is currently disposed and the target track in which information to be accessed is stored. However, discs themselves have inherent deviations in constant linear velocity, because they rotate at a high velocity. Due to such inherent deviation of each disc, the calculated number of tracks corresponding to the movement amount of the pick-up may not correspond to the actual number of tracks. That is, there may be an error in calculating the number of tracks. In case of a disc having several ten hundreds or more tracks, the error may exceed about 1,000 tracks. If the pick-up does not arrive at the target track or gives beyond the target track, due to the error, the above-mentioned track search mode has to be performed again at the position where the pick-up is stopped. As a result, there is a disadvantage that the access time required in reading information by moving the pick-up to a desired target track is delayed, for about 300 msec at a maximum. After the pick-up reaches the target track, a servo should be controlled at a constant linear velocity, so as to read information stored in the target track. In servo-controlling methods utilizing conventional CD utilizing appliances, however, controlling the servo at a constant linear velocity is impossible until the pick-up reaches the target completion of track after track searching. This is because the velocity of the spindle motor can not be accurately controlled during the track searching operation in conventional servo-controlling methods. Accordingly, there is a disadvantage in that a lot of time is required in making the servo stable at a constant linear velocity, after the track searching mode. This lengthens the access time from the track search mode before obtaining information from the target track. Consequently, it is difficult to accomplish an accessing at a high speed.

SUMMARY OF THE INVENTION

Therefore, an object of the invention is to eliminate the above-mentioned disadvantages encountered in the prior art and to provide an apparatus and a method for controlling a spindle, capable of stabilizing a servo just after a track search and thereby accomplishing an accessing of information at high speed. This can be accomplished by calculating the deviation in constant linear velocity of a compact disc itself which has been newly loaded, correcting the calculated number of tracks, based on the calculated deviation in constant linear velocity, to calculate the number of tracks which a pick-up is to be moved, and controlling in advance the rotation speed of a spindle motor in the track search made so as to obtain a desired constant linear velocity on a target track, based on the calculated number of tracks.

In one aspect, the present invention provides an apparatus for controlling a spindle motor of a compact disc utilizing appliance, comprising: means for detecting an actual rotation speed of the spindle motor; means for shaping the waveform of an output signal from the means for detecting the rotation speed of the spindle motor to convert it into a rotation speed frequency signal; a microcomputer for outputting a reference frequency signal, in response to the rotation speed frequency signal from the waveform shaping means and performing a control to access desired information Just after an operation in a track search mode is completed; means for comparing: the reference frequency signal outputted from the microcomputer and proportioned to the rotation speed of the spindle motor at a target track in the track search mode and the rotation speed frequency signal outputted from the waveform shaping means and proportioned to the rotation speed of the spindle motor and outputting control signals; means for amplifying differentially output signals from the frequency comparing means:; and spindle motor drive control signal switching means for selecting the output from the differential amplifying means (which amplifies and subtracts the signals to produce an amplified output signal) in a track search mode and a normal operation drive control signal in a normal operation mode after the operation in the track search mode is completed, under the control of the microcomputer, to output a spindle motor drive control signal to a spindle motor driving unit.

In another aspect, the present invention provides a method for controlling a spindle motor of a compact disc utilizing appliance, comprising the steps of: calculating the inherent deviation in constant linear velocity of a compact disc itself, under the control of a microcomputer, after the compact disc has been loaded in the appliance; and correcting the deviation in constant linear velocity calculated in the previous step, upon calculating the number of tracks in a search mode and controlling the rotation speed of the spindle motor, based on the corrected constant linear velocity.

BRIEF DESCRIPTION OF THE DRAWINGS

Other objects and aspects of the invention will become apparent from the following description of embodiments with reference to the accompanying drawings in which.

DETAILED OF THE PREFERRED EMBODIMENTS

Figure 2:
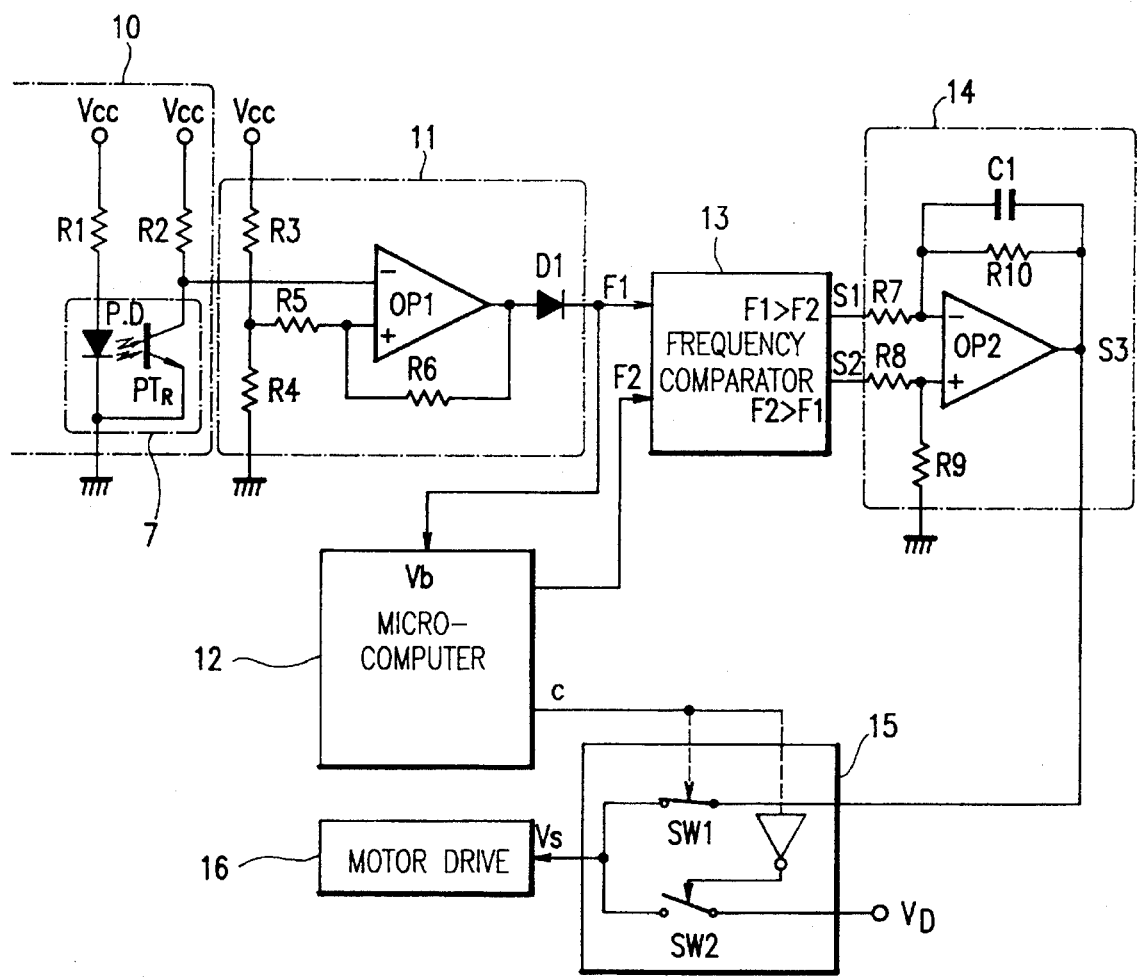
FIG. 2 is a circuit diagram of an apparatus for controlling the spindle motor, in accordance with the present invention.

Referring to FIG. 2, there is illustrated an apparatus for controlling a spindle motor of a compact disc utilizing appliance, in accordance with the present invention. As shown in FIG. 2, the control apparatus includes a device 10 for detecting the rotation speed of the spindle motor and outputting an electric signal indicative of the detected rotation speed, a waveform shaping unit 11 for shaping the waveform of the rotation speed detecting signal from the rotation speed detecting device 10, in the form of a square wave rotation speed frequency signal F1, a microcomputer 12 for outputting a reference frequency signal F2, in response to the rotation speed frequency signal F1 from the waveform shaping unit 11 and performing a control to access desired information just after an operation in a track search mode is completed, a frequency comparator 13 for comparing the reference frequency signal F2 outputted from the microcomputer 12 and proportioned to the rotation speed of the spindle motor at a target track in the track search mode and the rotation speed frequency signal F1 outputted from the waveform shaping unit 11 and proportioned to the rotation speed of the spindle motor and outputting control signals S1 and S2, a differential amplifying unit 14 for amplifying differentially output signals S1 and S2 from the frequency comparator 13 to output a signal for controlling the driving of the spindle motor such that the spindle motor drives at a target speed, and a spindle motor drive control signal switching unit 15 for selecting the output from the differential amplifying unit 15 in a the track search mode and selects a normal operation drive control signal $V_D$ in the normal operation mode after the operation in the search, mode is completed, to output a spindle motor drive control signal $V_S$ to a spindle motor driving unit 16.

As shown in FIG, 2, the device 10 for detecting the rotation speed of the spindle motor includes a rotation sensing circuit 7 including a light emitting photodiode P.D for receiving a voltage Vcc from a power source (not shown) via a resistor R1 to emit light and a light receiving phototransistor $P.T_R$ for receiving light emitted from the light emitting diode P.D at its base and the source voltage Vcc at its collector via a resistor R2 to generate an electric signal.

Figure 1A:
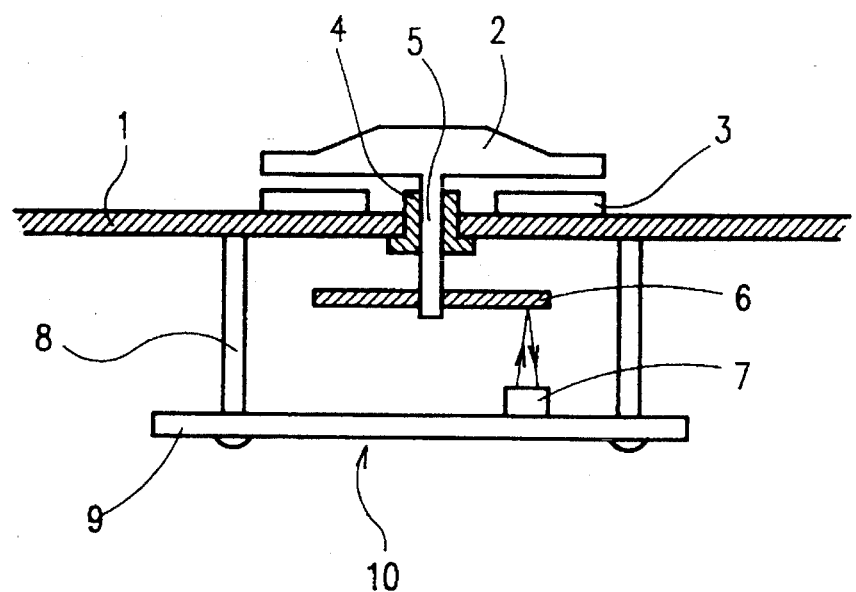
FIGS. 1A and 1B are a sectional view and a perspective view of a device for detecting the rotation speed of a spindle motor, in accordance with the present invention, respectively.
Figure 1B:
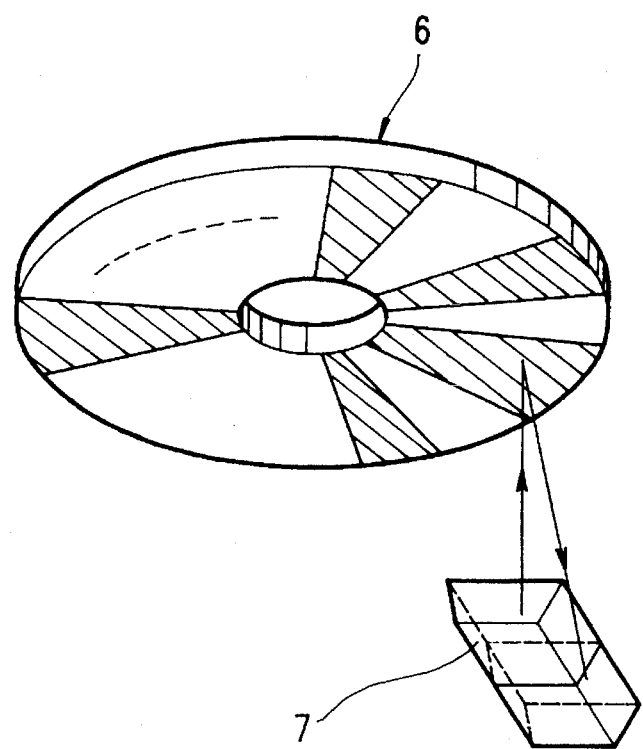

In order to detect the rotation speed of the spindle motor, the rotation speed detecting device 10 also includes a construction operatively connected to the spindle motor. As shown in FIGS. 1A and 1B, the rotation speed detecting device 10 includes a rotation disc plate 6 fixedly mounted to a rotation shaft 4 of the spindle motor extending outwardly through a spindle motor mounting chassis 1, to rotate together with the rotation shaft 4 and a support plate 9 mounted to the chassis 1 below the rotation disc plate 6, by means of support rods 8 extending downwardly from the chassis 1. The rotation disc plate has at its lower surface light reflecting portions and light receiving portions arranged alternately and spaced uniformly. On the other hand, the rotation sensing circuit 7 is mounted on the upper surface of the support plate 9 facing to the lower surface of the rotation disc plate 6. By the above-mentioned construction, light emitted from the light emitting photodiode P.D of the rotation sensing circuit 7 is continuously radiated at light reflecting portions and light receiving portions on the rotation disc plate 6. As the rotation disc plate 6 rotates by the rotation of spindle motor, light reflected from light reflecting portions are received sequentially at the light receiving phototransistor $P.T_R$, so that the light receiving phototransistor $P.T_R$ is repeatedly turned on and off, thereby generating an electric signal having the form of a sine wave proportional to the rotation speed signal of the spindle motor.

The wave form shaping unit 11 includes a comparator OP1 having an inverting input terminal (−) receiving the rotation speed detect signal from the rotation speed detecting device 10 and a non-inverting input terminal (+) receiving a reference voltage obtained by dividing t, he source voltage Vcc by resistors R3 and R4, via a resistor R5, so as to compare the rotation speed detect signal with the reference voltage, and a diode D1 for rectifying the output from the comparator OP1, so as to generate the square wave rotation speed frequency signal F1. The non-inverting input terminal (+) of the comparator OP1 is connected with the output terminal of the comparator OP1, via a resistor R6.

The frequency comparator 13, which compares the reference frequency signal F2 outputted from the microcomputer 12 and the rotation speed frequency signal F1 outputted from the waveform shaping unit 11, has two output terminals for outputting control signals S1 and S2, respectively. In an embodiment of the present invention, the control signal S1 has high level in case of F1>F2, while, the control signal S2 has high level in case of F2>F1. In a case where $F_1=F_2$, both of the control signals become zero (0).

The differential amplifying unit 14 includes a comparator OP2 having an inverting input terminal (−) receiving the control signal S1 from the frequency comparator 13 via a resistor R7 and a non-inverting input-terminal (+) receiving the control signal S2 from the frequency comparator 13 via a resistor R8. The non-inverting terminal of the comparator OP2 is also grounded, via a resistor R9. On the other hand, a capacitor C1 and a resistor R10 connected in parallel to each other are connected between the inverting terminal (−) and the output terminal of the comparator OP2, which provides an amplified output signal proportional to the difference (e.g. subtraction) of the two inputs.

The spindle motor drive control signal switching unit 15 includes two switches SW1 and SW2. The switch SW1 is connected to the output of the differential amplifying unit 14, so as to receive the output signal S3 from the differential amplifying unit 14 in the search mode, according to a control signal C from the microcomputer 12. On the other hand, the switch SW2 receives the normal operation drive control signal $V_D$ when operated in the normal mode after the operation in the search mode is completed.

In FIG. 1A, the reference numeral "2" designates a rotation part of the spindle motor and the reference numeral "3" designates a drive coil of the spindle motor.

The operation of the control apparatus according to the present invention will now be described in detail.

As a compact disc player equipped with the control apparatus of the present invention is driven, under the condition that a compact disc has been loaded on the upper surface of the spindle motor rotation part 2, the spindle motor drive control signal $V_S$ is applied to the spindle motor driving coil 3, thereby causing the spindle motor rotation part 2 to rotate. By the rotation of the spindle motor rotation part 2, the shaft 5 rotates. At this time, light emitted from the light emitting photodiode P.D of the rotation sensing circuit 7 is radiated at the lower surface of the rotation disc plate 6. In that light reflecting portions and light receiving portions are arranged on the lower surface of the rotation disc plate 6 in an alternating type, light emitted from the light emitting photodiode P.D is repeatedly reflected and received. By light reflected sequentially from light reflecting portions, the light receiving phototransistor $P.T_R$ turns on and off repeatedly. Accordingly, the rotation speed signal of the spindle motor, which has a sine wave form proportional to the rotation speed of the spindle motor, is detected.

Figure 3:
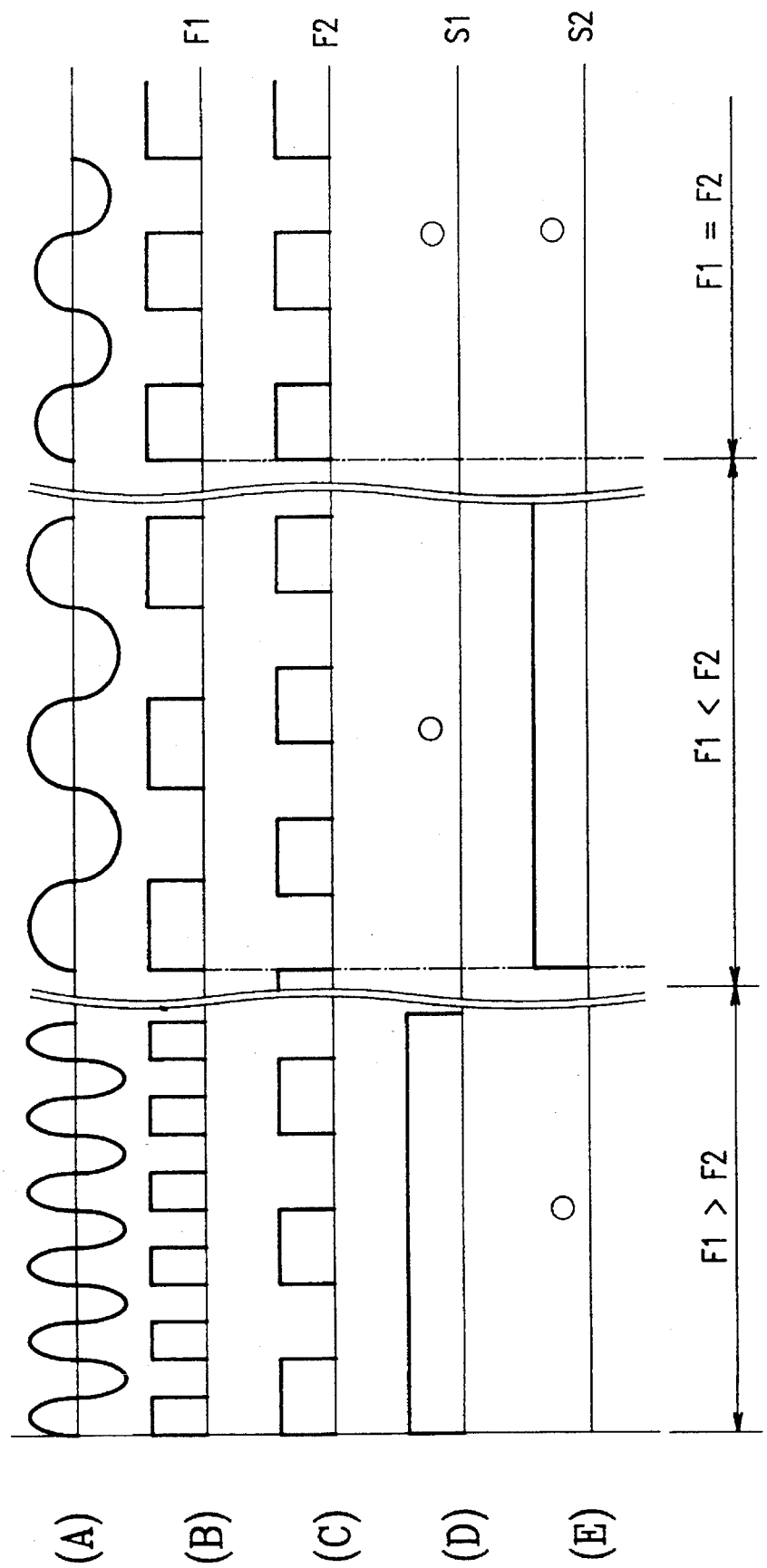
FIG. 3 are views illustrating waveforms of signals outputted from respective parts of the control apparatus according to the present invention, respectively.

Referring to FIGS. 3A to 3E, there are shown waveforms of signals outputted from respective parts of the control apparatus according to the present invention. When the rotation sensing circuit 7 senses the rotation speed of the rotation disc plate 6 which rotates together with the spindle motor rotation part 2, by the rotation of the spindle motor, a rotation detect signal which has an analog type waveform as shown in FIG. 3A is detected. This analog waveform is applied to the inverting input terminal of the comparator OP1 of the waveform shaping unit 11. By the comparator OP1, the rotation detect signal (FIG. 3A) is compared with a reference voltage f which is applied to the non-inverting terminal of the comparator OP1 via the resistor R5 and then converted into a square wave signal. The square wave signal is rectified by the diode D1 to have a half-wave and shaped into a rotation speed detect frequency signal F1.

Figure 5:
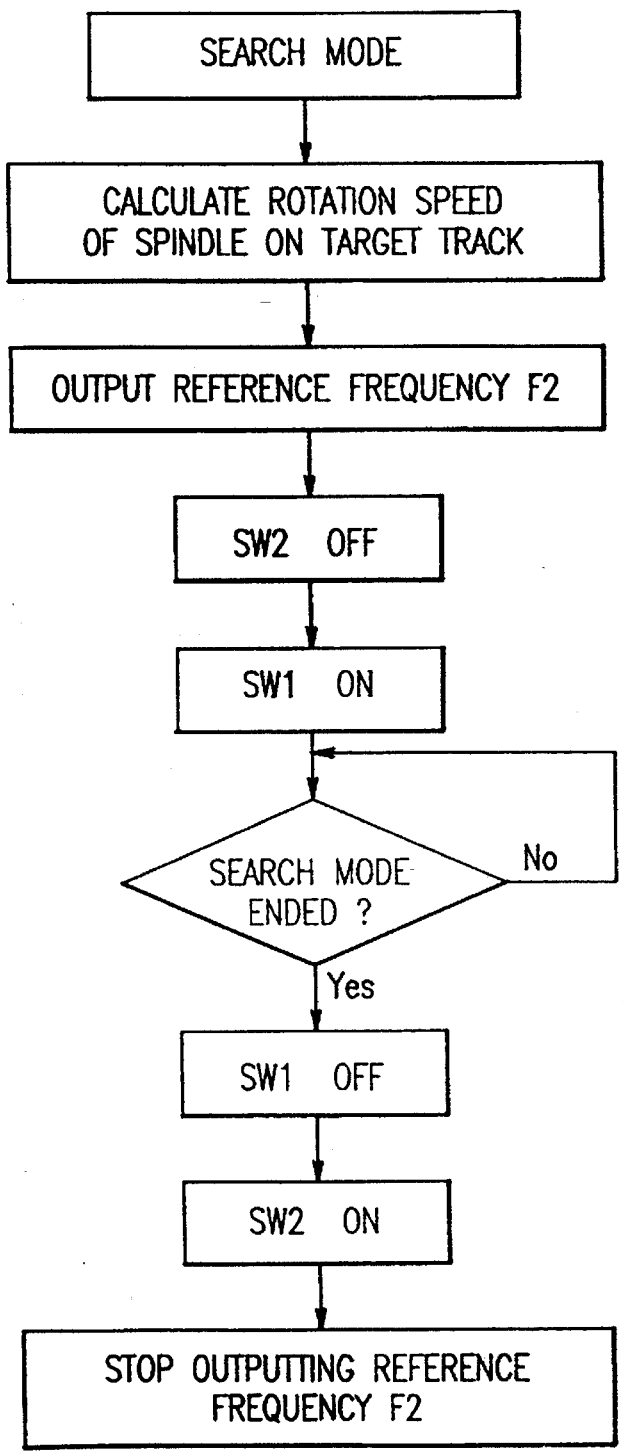
FIG. 5 is a flowchart of a control process carried out by the control apparatus of the present invention, In a search mode.

The wave-shaped rotation speed detect frequency signal F1 indicative of the actual rotation speed of the spindle motor is inputted to both the microcomputer 12 and the frequency comparator 13. To generate a reference frequency signal F2, the microcomputer 12 calculates the rotation speed of the spindle motor corresponding to a constant linear velocity on the target track in the track search mode, according to a spindle motor controlling procedure in the track search mode, as shown in FIG. 5. In order to read information recorded on the target track, the rotation speed of the spindle motor should be controlled to correspond to a constant linear velocity. Accordingly, various reference frequency signals F2 capable of meeting various cases should be stored, after many times of tests and precise calculations have been made. In the track search mode, the microcomputer 12 outputs one reference frequency signal F2 capable of controlling the spindle motor at a constant linear velocity corresponding to the detected frequency signal F1.

As the microcomputer 12 generates the reference frequency signal F2 meeting the target track in the track search mode and inputs it to the frequency comparator 11, the frequency comparator 11 compares the received reference frequency signal F2 with the detected frequency signal F1 corresponding to the actual rotation speed of the spindle motor. If the detected frequency signal F1 has a frequency higher than that of the reference frequency signal F2, the frequency comparator 13 outputs a high level signal at its first output terminal outputting the control signal S1 and a low level signal at its second output terminal outputting the control signal S2. On the other hand, when the detected frequency signal F1 has a frequency lower than that of the reference frequency signal F2, the frequency comparator 13 outputs a low level signal at its first output terminal and a high level signal at its second output terminal. These operations of the frequency comparator 13 are apparent by referring to FIGS. 3A to 3E.

That is, when the current rotation speed of the spindle motor is lower than the constant linear velocity, the control signal S1 from the frequency comparator 13 has a low level, while the control signal S2 has a high level. On the other hand, if the current rotation speed of the spindle motor is higher than the constant linear velocity, the control signal S1 has a high level, while the control signal S2 has a low level.

Figure 4:
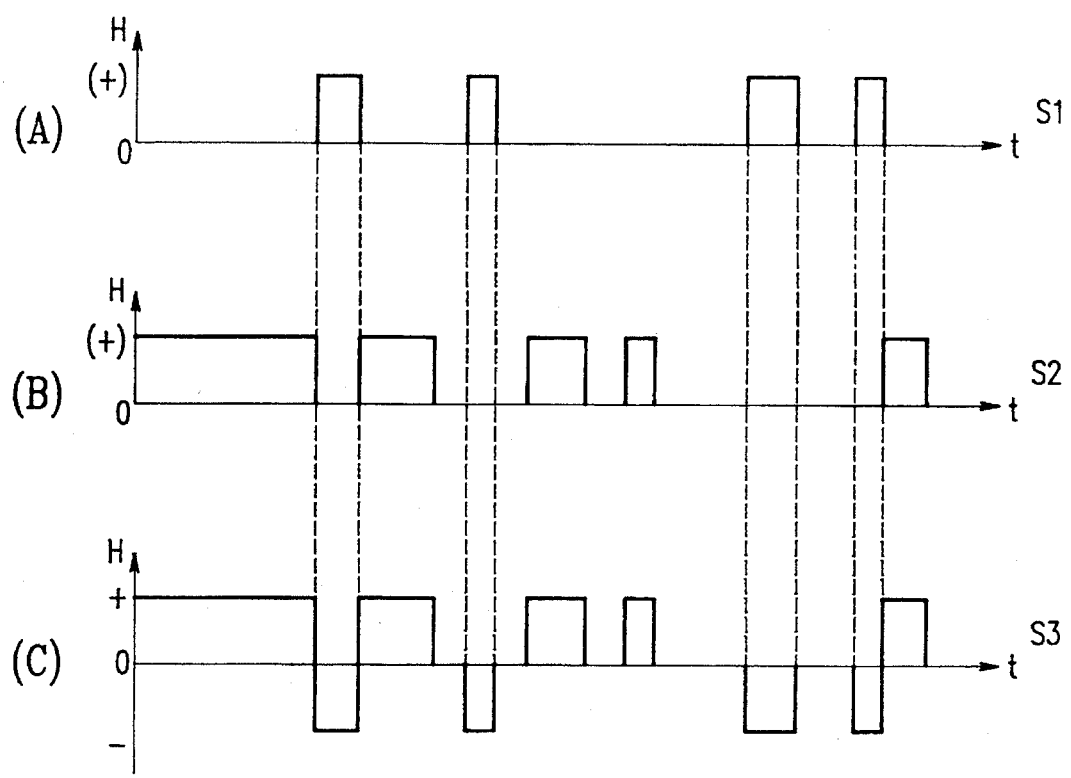
FIG. 4 are views illustrating waveforms of input/output signals from a differential amplifying unit according to the present invention, respectively.

The control signal S1 from the frequency comparator 13 is applied to the differential amplifying unit 14 to be amplified differentially. If the frequency comparator 13 generates the first control signal S1 and the second control signal S2 having respective waveforms shown in FIGS. 4A and 4B, the differential amplifying unit 14 generates a drive control signal S3 which is a negative output in a high level interval of the first control signal S1 and a positive output in a high level interval of the second control signal S2, so as to drive the spindle motor at constant linear velocity.

At this time, the microcomputer 12 outputs a control signal C to turn on the first select switch SW1 of the spindle motor drive control signal switching unit 15 in the track search mode. In the track search mode, accordingly, the drive control signal S3 from the differential amplifying unit 14 is applied to the motor driving unit 15 via the select switch SW1, thereby enabling the rotation of the spindle motor to be controlled at constant linear velocity meeting the target track. After the operation in the track search mode is completed, the microcomputer 12 turns off the first select switch SW1 ,and simultaneously turns on the second select switch SW2, so as to apply a normal drive control signal $V_D$ to the spindle motor driving unit 15. After the operation in the track search mode is completed, accordingly, the spindle motor is driven at a normal state. At this time, the microcomputer 12 stops the generation of the reference frequency signal F2 corresponding to constant linear velocity. Since the pick-up should move several hundred tracks to several ten hundred tracks or more tracks during a track search in a track search mode, it is impossible to control the servo at constant linear velocity. As a result, the prior art has a disadvantage of requiring a lot of time in controlling normally the servo at a constant linear velocity on the target track according to the control for the phase of the spindle motor, after the search. However, the present invention controls the rotation speed of the spindle motor to correspond to the rotation speed on the target track during the track search so that, when the pick-up reaches the target track after the search, the spindle motor rotates at a desired constant linear velocity on the target track. Accordingly, it is possible to access stable information immediately after the track search.

On the other hand, the number of tracks which the pick-up has to move should be calculated so as to reduce the time required in accessing information. However, the calculated value of the number of tracks may not correspond to the actual value, due to the deviation in constant linear velocity. The difference between the calculated value and the actual value greatly affects on the access time. In order to calculate accurately the number of tracks which the pick-up has to move in the track search, accordingly, the deviation in constant linear velocity of the loaded disc itself is calculated and the difference caused by the deviation in constant linear velocity is corrected in calculating the number of tracks.

Figure 6:
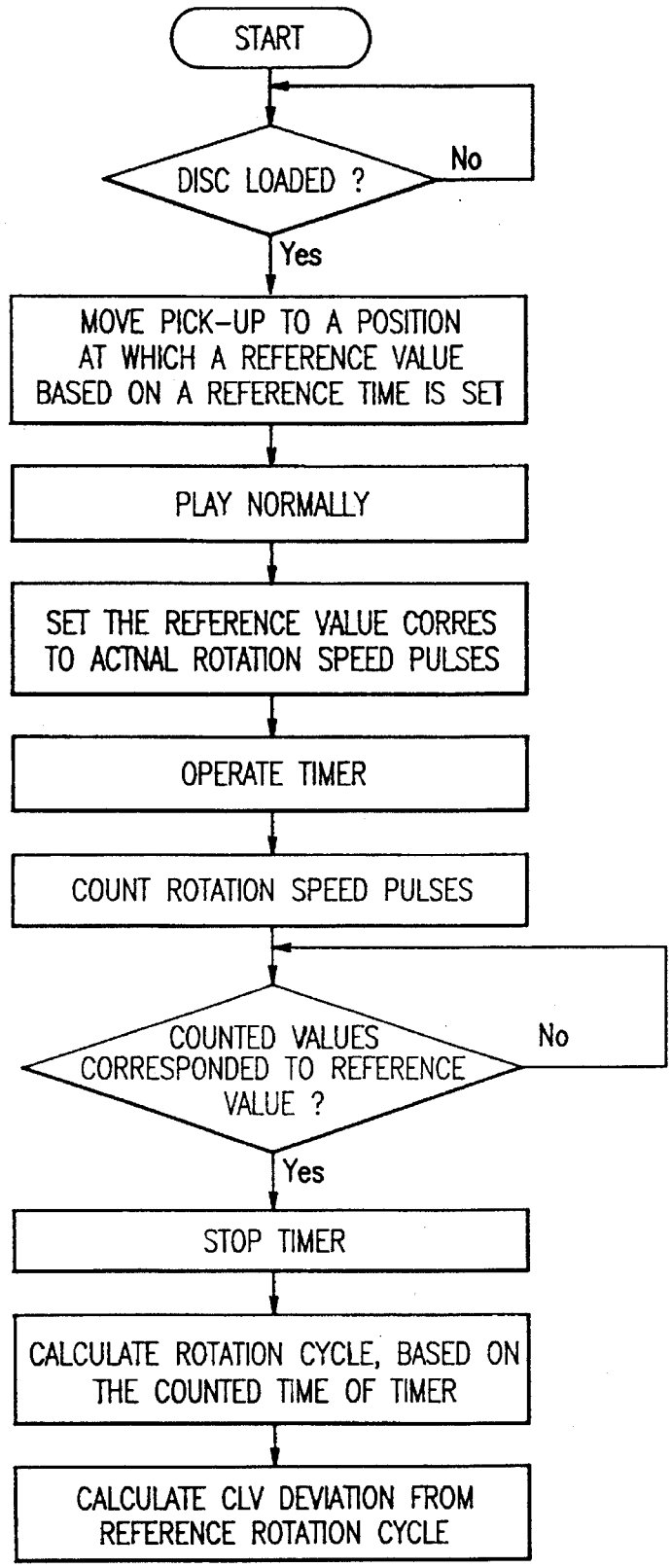
FIG. 6 is a flowchart of a process for controlling the detection of the deviation in constant linear velocity, according to the present invention.

FIG. 6 is a flowchart illustrating a process for controlling the detection of the. deviation in constant linear velocity, according to the present invention. As shown in FIG. 6, the process is initiated by loading a new compact disc in, for example, a compact disc player. After the loading of the compact disc, the pick-up is moved to a track corresponding to a predetermined reference position, under the control of the microcomputer 12. Thereafter, the compact disc player is played normally so that the rotation cycle at this time is detected.

At this time, the predetermined reference position is the reference track which is predetermined to have the number of pulses detected when the compact disc is rotated at a constant linear velocity and for a predetermined reference time. By tests and precise calculations, a proper position is predetermined to correspond to the reference position.

When a new compact disc is loaded in the compact disc player, the pick-up is moved to the track corresponding to the reference position for which the reference time is predetermined under the control of the microcomputer 12. Thereafter, a normal play is initiated. Accordingly, the rotation disc plate 6 of the device 10 for detecting the rotation speed of spindle motor rotates. The rotation speed sensing circuit 7 senses the rotation speed of the rotation disc plate 6 and generates an analog signal corresponding to the sensed rotation speed, as shown in FIG. 3A. The analog signal is converted into a square wave pulse shown in FIG.3B and then applied to the microcomputer 12. The microcomputer 12 counts rotation speed pulses indicative of the rotation speed of the spindle motor, to correspond to the number of reference pulses for the reference time.

The reference position is the position which has the number of reference pulses in the rotation at constant linear velocity and for the reference time. After the movement of the pick-up to the reference position, accordingly, the counted reference value indicative of the reference number of pulses at the reference position is set during the normal play. Thereafter, the number of detected rotation speed pulses is counted up until it corresponds to the set number of reference pulses, by actuating a timer. When the number of detected rotation speed pulses corresponds to the set number of reference pulses, the operation of timer is stopped and then the time taken in counting the number of reference pulses is checked. Then, the rotation cycle of the compact disc is calculated, based on the counted time detected by the timer and the number of reference pulses. This calculated disc rotation cycle is compared with the reference rotation cycle based on the number of reference pulses for the reference time, to calculate the inherent deviation in constant linear velocity of the compact disc. The calculated deviation in constant linear velocity is stored to be used as a parameter for correcting the number of tracks in every calculation of the number of tracks.

Accordingly, the access time can be reduced, by detecting the actual rotation cycle of a compact disc on the track corresponding to the reference position having the number of reference pulses, calculating and storing the deviation in constant linear velocity of the disc itself, based on the difference between the detected actual rotation cycle and a reference rotation cycle predetermined by the rotation at a constant linear velocity, and correcting the number of tracks in every track calculation in the track search mode, based on the calculated deviation in constant linear velocity, to control the spindle motor.

As apparent from the above description, the present invention provides an apparatus and a method for controlling a spindle motor, capable of controlling the spindle motor by detecting the rotation speed of the spindle motor to correspond the rotation speed to a rotation speed of a pick-up on a target track of a compact disc in a track search mode and correcting the rotation speed of the spindle motor in every track calculation, based on the inherent deviation in constant linear velocity of the compact disc calculated by a microcomputer, thereby enabling the time required in accessing information to be reduced. Consequently, the present invention can be effectively applied to various CLF type compact disc utilizing appliances such as CD-ROM drives, CD-I players, laser disc players (CLV type) and multi-disc players.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling a spindle motor of a compact disc utilizing appliance, comprising:

rotation speed detecting means for detecting an actual rotation speed of the spindle motor and outputting a signal having a frequency proportional thereto;

means for shaping the waveform of the signal output from the rotation speed detecting means to form a rotation speed frequency signal;

a microcomputer for outputting a reference frequency signal in response to said rotation speed frequency signal and for outputting a control signal to control an input to said spindle motor depending on operating modes of said apparatus, said reference frequency signal being such that, during a track search mode of said apparatus, said reference signal is utilized in forming a signal to the spindle motor, the spindle motor is driven at a determined speed which causes a target track to move at a constant linear velocity with respect to a pick-up;

means for comparing the reference frequency signal outputted from the microcomputer and the rotation speed frequency signal outputted from the waveform shaping means and outputting control signals;

means for amplifying and subtracting said control signals so as to output an amplified control signal; and spindle motor drive control signal switching means for selecting, as the input to said spindle motor under the control of the control signal from the microcomputer, said amplified control signal when said apparatus is in a track search mode, versus selecting as said input a normal mode operation drive control signal when said apparatus is in the normal operation mode to thereby cause the spindle motor to be rotating at said determined speed upon entering said normal operation mode from said track search mode, thus permitting rapid accessing of information immediately upon entering said normal operation mode from said track search mode.

2. The apparatus as claimed in claim 1, wherein said means for detecting the rotation speed of spindle motor includes:

the spindle motor having a rotation shaft extending rotatably through a spindle motor mounting chassis;

a rotation disc plate fixedly mounted to the rotation shaft to rotate together therewith and provided at its lower surface with light reflecting portions and light receiving portions arranged alternately and spaced uniformly; and rotation sensing means for radiating at the light reflecting portions and light receiving portions of the rotation disc plate and receiving light reflected from the light reflecting portions to detect the rotation speed of spindle motor as an electric signal.

3. The apparatus as claimed in claim 1, wherein the microcomputer outputs the reference frequency signal enabling the spindle motor at a constant linear velocity corresponding to each of rotation speed detect frequency signals of various cases in the track search mode.

4. The apparatus as claimed in claim 1, wherein said means for comparing outputs a high level signal at its first output terminal and a low level signal at its second output terminal when the detected frequency signal has a frequency higher than that at of the reference frequency signal, and outputs a low level signal at its first output terminal and a high level signal at its second output terminal when the detected frequency signal has a frequency lower than that of the reference frequency signal.

* * * * *